(12) United States Patent
Gregg (10) Patent No.: US 8,161,107 B2
(45) Date of Patent: Apr. 17, 2012

(54) ROAMING PERSONAL INFORMATION ITEMS ACROSS MULTIPLE COMPUTING DEVICES USING AN IMAP SERVER

(75) Inventor: Ryan Edward Gregg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/344,590

(22) Filed: Dec. 29, 2008

(65) Prior Publication Data
US 2010/0169406 A1    Jul. 1, 2010

(51) Int. Cl.
*G06F 15/16* (2006.01)
(52) U.S. Cl. .......................... 709/204; 709/206; 709/246
(58) Field of Classification Search .................. 709/204, 709/206, 246
See application file for complete search history.

(56) References Cited

U.S. PATENT DOCUMENTS

| | | | |
|---|---|---|---|
| 6,564,249 B2 | 5/2003 | Shiigi | |
| 6,898,422 B2 | 5/2005 | Bern et al. | |
| 7,440,746 B1 * | 10/2008 | Swan | 455/412.1 |
| 7,933,587 B1 * | 4/2011 | Swan | 455/412.1 |
| 2002/0124057 A1 | 9/2002 | Besprosvan | |
| 2004/0093317 A1 * | 5/2004 | Swan | 707/1 |
| 2007/0014244 A1 * | 1/2007 | Srinivasan et al. | 370/252 |
| 2007/0016632 A1 * | 1/2007 | Schulz et al. | 707/204 |
| 2007/0027886 A1 | 2/2007 | Gent et al. | |
| 2007/0208803 A1 | 9/2007 | Levi et al. | |
| 2008/0040441 A1 * | 2/2008 | Maes | 709/207 |

OTHER PUBLICATIONS

"Symbian OS Version 9.2", retrieved at <<http://www.symbian.com/files/rx/file6883.pdf>>, p. 2.
"Introducing Lotus Notes 6", retrieved at <<http://media.wiley.com/product_data/excerpt/3X/07821405/078214053X.pdf>>, p. 1-14.
"Nokia Mobile Devices and Oracle Collaboration Suite", retrieved at <<http://nfb.online.nokia.com/Page%20Content/Mobilize%20your%20Business/Knowledge%20Center/White%20Papers/WhitePaper_OracleCollaborationSuite.pdf>>, Apr. 2006, p. 21.
"MORANGE Enterprise Server White Paper", retrieved at <<http://monet.morange.com/resc/MORANGE%20Enterprise%20Server%20Whitepaper.pdf>>, p. 1-23.
"WebServe Hosted Exchange Web based Outlook Web Access, Exchange", retrieved at <<http://www.webserve.ca/webhosting/exchange/hostedexchange/>>, Oct. 15, 2008, p. 1-4.
"Sharing Outlook Information", retrieved at <<http://microsoft-outlook.blogspot.com/2008/03/sharing-outlook-information.html>>, Mar. 11, 2008, p. 1-7.
"Symbian OS Version 9.2", downloaded Oct. 15, 2008 from http://www.symbian.com/files/rx/file6883.pdf, 2 pages.
"Introducing Lotus Notes 6", downloaded Oct. 15, 2008 from http://media.wiley.com/product_data/excerpt/3X/07821405/078214053X.2pdf, 14 pages. "MORANGE Enterprise Server White Paper", downloaded Oct. 15, 2008 from http://monet.morange.com/resc/MORANGE%420Enterprise%20Server%20Whitepaper.pdf, 2 pages.

* cited by examiner

*Primary Examiner* — Douglas Blair
(74) *Attorney, Agent, or Firm* — Hope Baldauff Hartman, LLC (57) ABSTRACT

Technologies for roaming personal information items across multiple computing devices using an IMAP server are provided. When a change is detected to a personal information item maintained by a PIM program one computing device, the data representing the personal information item is uploaded from the computing device to an IMAP server, where it is stored as a message in a user mailbox designated to hold personal information items. A second computing device then downloads the message storing the data representing the personal information item from the IMAP server and makes it available to a PIM program executing on the second computing device.

20 Claims, 5 Drawing Sheets

ROAMING PERSONAL INFORMATION ITEMS ACROSS MULTIPLE COMPUTING DEVICES USING AN IMAP SERVER

BACKGROUND

A user may utilize multiple computing devices to view and maintain e-mail and personal information items, such as contacts, calendar items, tasks, notes, and journal entries. Such devices include personal computers ("PC"), digital cellular phones, personal digital assistants ("PDA"), game consoles, set-top boxes, etc. Each of these devices may have a different software program, known as a personal information manager ("PIM"), for the management of e-mail and personal information items.

Many of the PIM programs on the user's devices may support the "roaming" of e-mail across multiple devices. In other words, the user's e-mail may be stored in a standard format in a central location and replicated to the PIM on multiple of the user's devices. In this way, changes made to the e-mail on one device, such as deleting a message or marking a message as read, may be replicated to the user's other devices. Traditionally, however, a PIM maintains other personal information items for the user in a local storage, often using native formats specific to the individual PIM program. Changes made to a personal information item, such as a contact or task, on one device may be isolated to that device and unavailable to the user's other devices. While some server programs may exist that allow roaming of personal information items across devices, these servers often use proprietary protocols and may be limited to access by a specific client application.

It is with respect to these considerations and others that the disclosure made herein is presented.

SUMMARY

Technologies are described herein for roaming personal information items across multiple computing devices using an Internet message access protocol ("IMAP") server. According to this description, when a change is detected to a personal information item maintained by a PIM program executing on one computing device, the data representing the personal information item is uploaded to an IMAP server where it is stored as a message in a user mailbox designated to hold personal information items. A second computing device then downloads the message storing the data representing the personal information item from the IMAP server and makes it available to a PIM program executing on the second computing device.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for roaming personal information items for a user across multiple PIM programs on multiple computing devices utilizing an IMAP server. Utilizing the technologies described herein, a PIM executing on one of a user's devices can add or change a personal information item maintained in the local storage of the device, and replicate those changes to any centralized mail server on the Internet supporting IMAP. The PIMs on the user's other devices can then periodically synchronize their local storage of personal information items with that of the centralized mail server, thus making the changes made to personal information items on one device available to the other devices of the user.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and that show, by way of illustration, specific embodiments or examples. In the accompanying drawings, like numerals represent like elements through the several figures.

Figure 1:
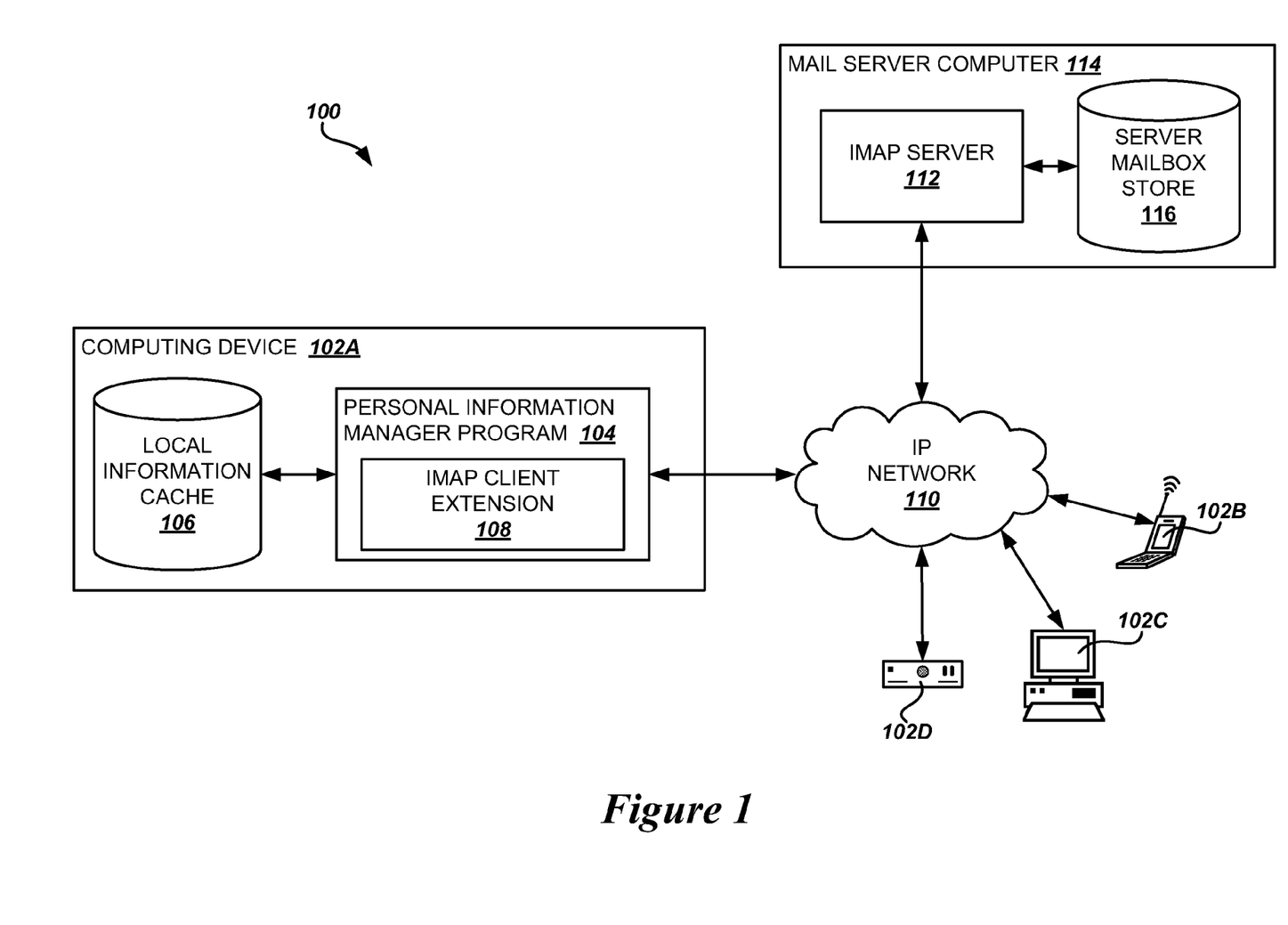
FIG. 1 is a block diagram showing aspects of an illustrative operating environment and several software components provided by the embodiments presented herein.

FIG. 1 shows an illustrative operating environment 100 including several software components for roaming personal information items between multiple computing devices using an IMAP server, according to embodiments provided herein. The environment 100 includes any number of computing devices 102A-102D (referred to herein generally as computing device(s) 102) that may be utilized by a user to access and maintain the user's e-mail and/or personal information items. The computing device 102 may be a PC, a digital cellular phone, a PDA, a game console, a set-top box, a Web server hosting a Web-based application program, or any other computing device.

The computing device 102 executes a PIM program 104. The PIM program 104 may be an application program that allows the user to maintain the user's e-mail and personal information items, such as contacts, tasks, calendar items, notes, and journal entries, through a single, unified interface. Examples of the PIM program may include, but are not limited to, the MICROSOFT® OUTLOOK® messaging and collaboration client from Microsoft Corporation of Redmond, Wash., or the IBM® LOTUS® NOTES® client program from IBM Corporation of Armonk, N.Y. The PIM program 104 may also be a special purpose program that allows the user to maintain a subset of the user's personal information items, such as the Contacts or Calendar applications on the APPLE® IPHONE™ mobile digital device from Apple Inc. of Cupertino, Calif. Further, the PIM program 104 may be a Web-based application executing on a Web server that provides a user access to one or more of the user's personal information items, such as the GOOGLE CALENDAR™ calendaring service from Google, Inc. of Mountain View, Calif.

The PIM program 104 may maintain a copy of the user's personal information items in a local information cache 106, located on the computing device 102 or on an external file system connected to the computing device. The format of the personal information items stored in the local information cache may be native to the specific PIM program 104 executing on the computing device 102.

According to embodiments described herein, the PIM program 104 uses an IMAP client extension 108 to roam personal information items across multiple of the user's computing devices. In other words, through the IMAP client extension 108, additions, deletions, and modifications made to personal information items made on one of the user's computing devices 120A may be reflected on the user's other devices 102B-102D. The IMAP client extension 108 may be a module contained in the PIM program 104, or it may be an external component located on the computing device 102 that provides services to the PIM program through an application programming interface ("API"). The IMAP client extension 108 communicates over an IP network 110 to an IMAP server 112 executing on a mail server computer 114 or other server computer, network appliance, or special-purpose computing device connected to the IP network. The IP network 110 may be the Internet, a local area network ("LAN"), or a wide-area network ("WAN").

As will be appreciated by one skilled in the art, the IMAP server 112 allows computing devices 102A-102D to access messages across the IP network 110 through the Internet message access protocol version 4 ("IMAPv4"). IMAPv4 is an open standard for the manipulation of e-mail messages on a remote server over the Internet. IMAPv4 is supported by the majority of mail server programs on the Internet, and is defined in Internet Engineering Task Force ("IETF") RFC 3501 entitled "Internet Message Access Protocol—Version 4rev1," which is incorporated herein by reference in its entirety. Examples of mail server programs that support IMAPv4 include the MICROSOFT® EXCHANGE SERVER 2007 server program from Microsoft Corporation, IBM® LOTUS® DOMINO® server from IBM Corporation, or EUDORA® WORLDMAIL 4 server from QUALCOMM Incorporated of San Diego, Calif.

Figure 2:
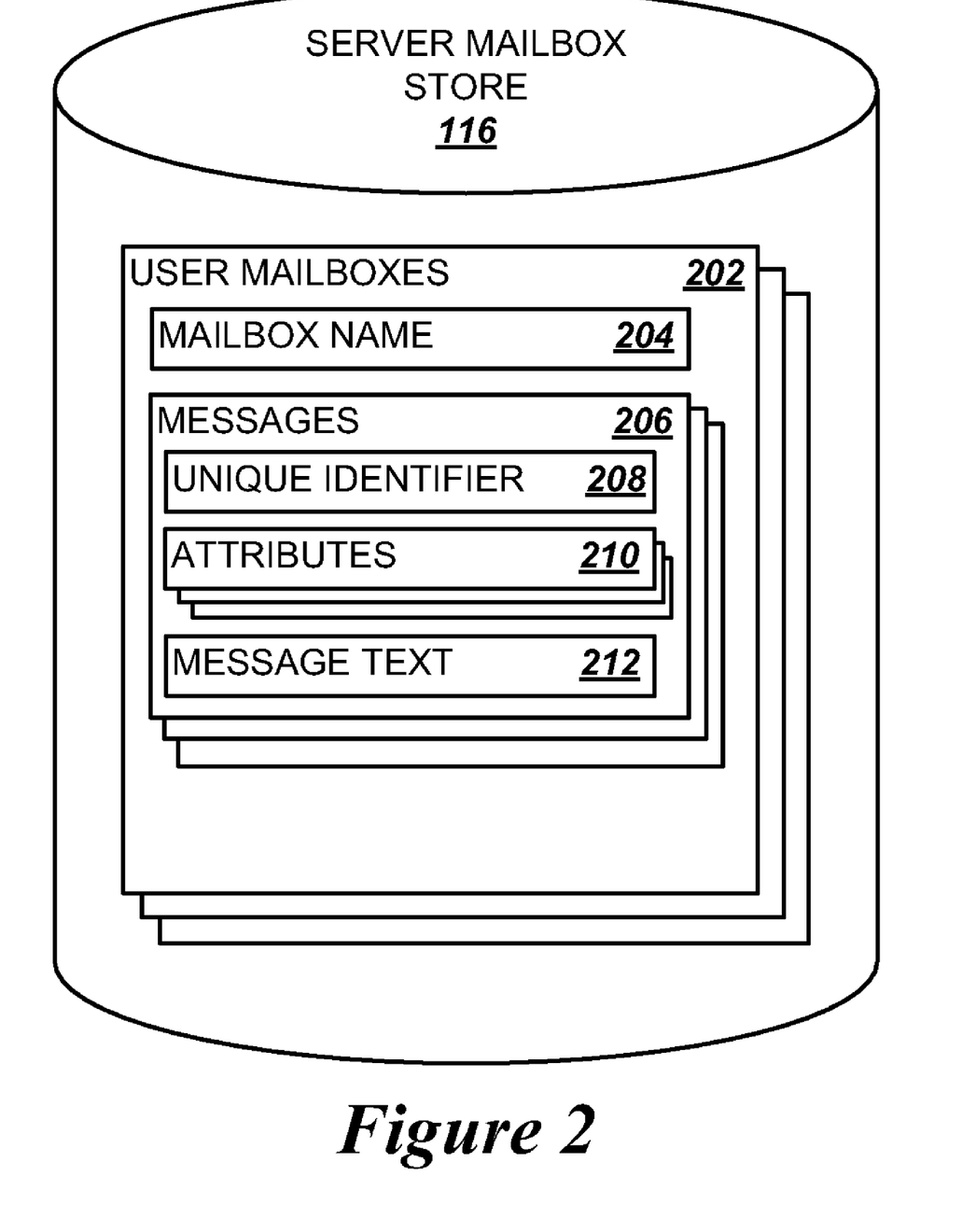
FIG. 2 is a block diagram showing further details of the server mailbox storage, according to embodiments described herein.

The IMAP server 112 may maintain the messages for the user in a server mailbox store 116, located on the mail server computer 114 or some other file system or storage mechanism connected to the mail server computer. As shown in FIG. 2, the information in the server mailbox store 116, as defined by the IMAPv4 protocol, is divided into individual user mailboxes 202. IMAP client programs, such as the IMAP client extension 108, may utilize commands defined by the IMAPv4 protocol to create, delete, and enumerate the user mailboxes 202 on the IMAP server 112 for an individual user.

Any number of user mailboxes 202 may be created, each with a unique mailbox name 204. Some mailbox names may be reserved by the IMAPv4 protocol specifically for e-mail messages, such as the mailbox name "INBOX." According to embodiments herein, the IMAP client extension 108, executing in conjunction with a PIM program 104 on one of the user's computing devices 102A, may create an individual user mailbox 202 in the server mailbox store 116 of the IMAP server 112 for each type of personal information item that the PIM program maintains, as will be discussed in more detail below with respect to FIG. 3.

The user mailboxes 202 in the server mailbox store 116 may contain one or more messages 206. The messages 206 may contain e-mail messages received for the user by the mail server computer 114, or the messages may contain personal information items associated with the user mailbox 202 that are created or modified by the PIM program 104 and replicated to the IMAP server 112 by the IMAP client extension 108, as will be further discussed below with respect to FIG. 3. According to the IMAPv4 protocol, an individual message 206 in a user mailbox 202 has a unique identifier 208. The unique identifier 208 is unique across the specific user mailbox 202 and serves to uniquely identify the individual message 206 to IMAP client programs, such as the IMAP client extension 108, accessing the IMAP server 112.

A message 206 also contains one or more attributes 210. The attributes 210 define properties of the message 206 that are utilized by the IMAP server 112 and IMAP client programs to manage the messages contained in the user mailboxes 202. Attributes 210 may include the date and time that the message 206 was received, a set of flags that indicate whether the message is new, has been read, or is marked for deletion, the size of the message, and other message properties as defined in the IMAPv4 protocol.

The contents of a message 206 are stored in a message text 212 field. The message text 212 may include any text content for the message, although the IMAPv4 protocol recommends that the message text 212 be consistent with IETF RFC 2822 entitled "Internet Message Format." Messages in the Internet message format may include a message header, a body, and one or more "file attachments." According to one embodiment, the IMAP client extension 108 replicates personal information items maintained in the PIM program 104 to the IMAP server 112 as IMAP messages 206 with an RFC 2822 compliant message text 212. The message text 212 of the message 206 contains the data representing the personal information item serialized into the body of the message or attached as a file attachment, as will be discussed in more detail below with respect to FIG. 3.

Figure 3:
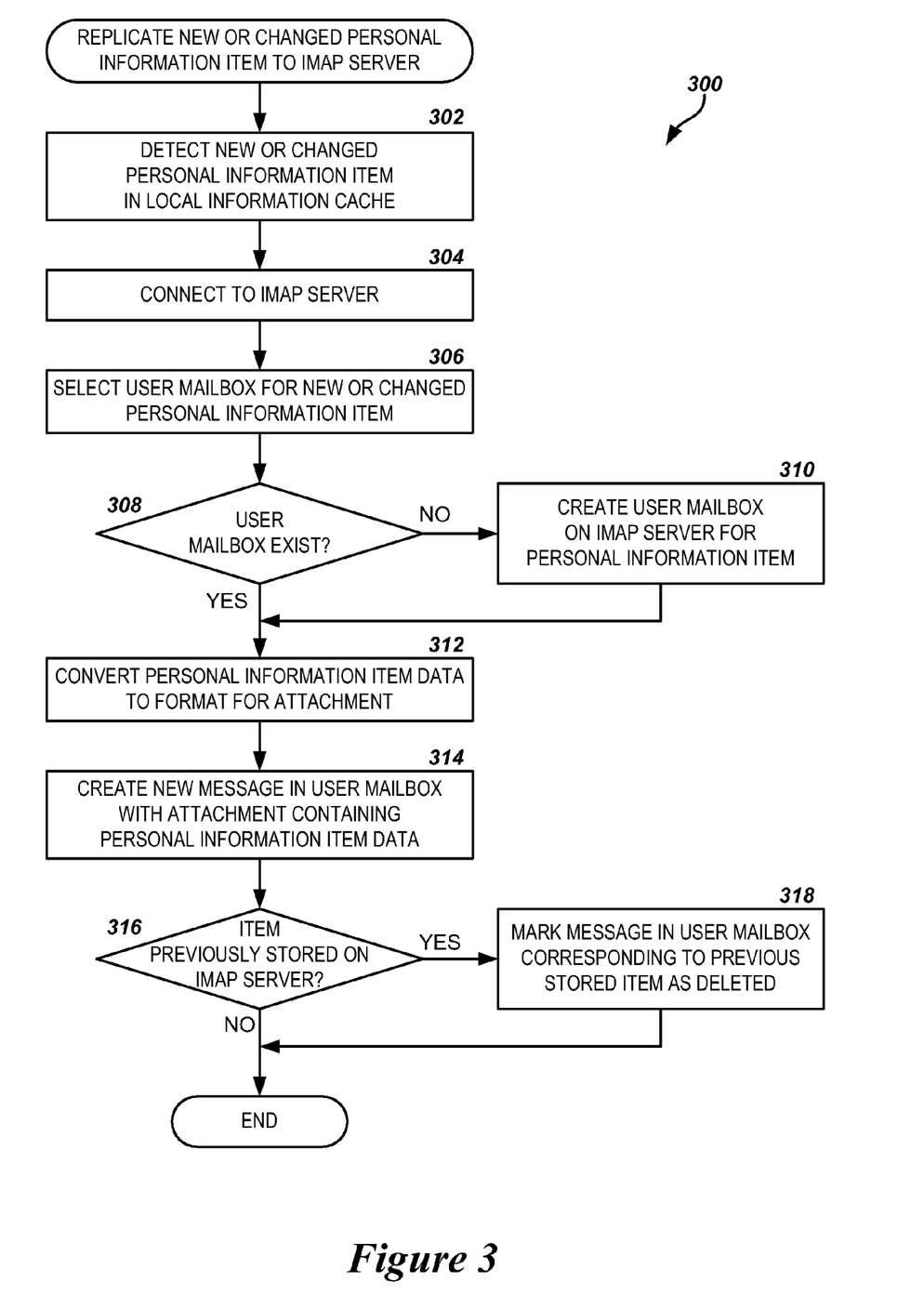
FIG. 3 is a flow diagram showing methods for replicating new or modified personal information items from a local information cache of a PIM program to an IMAP server, according to embodiments described herein.
Figure 4:
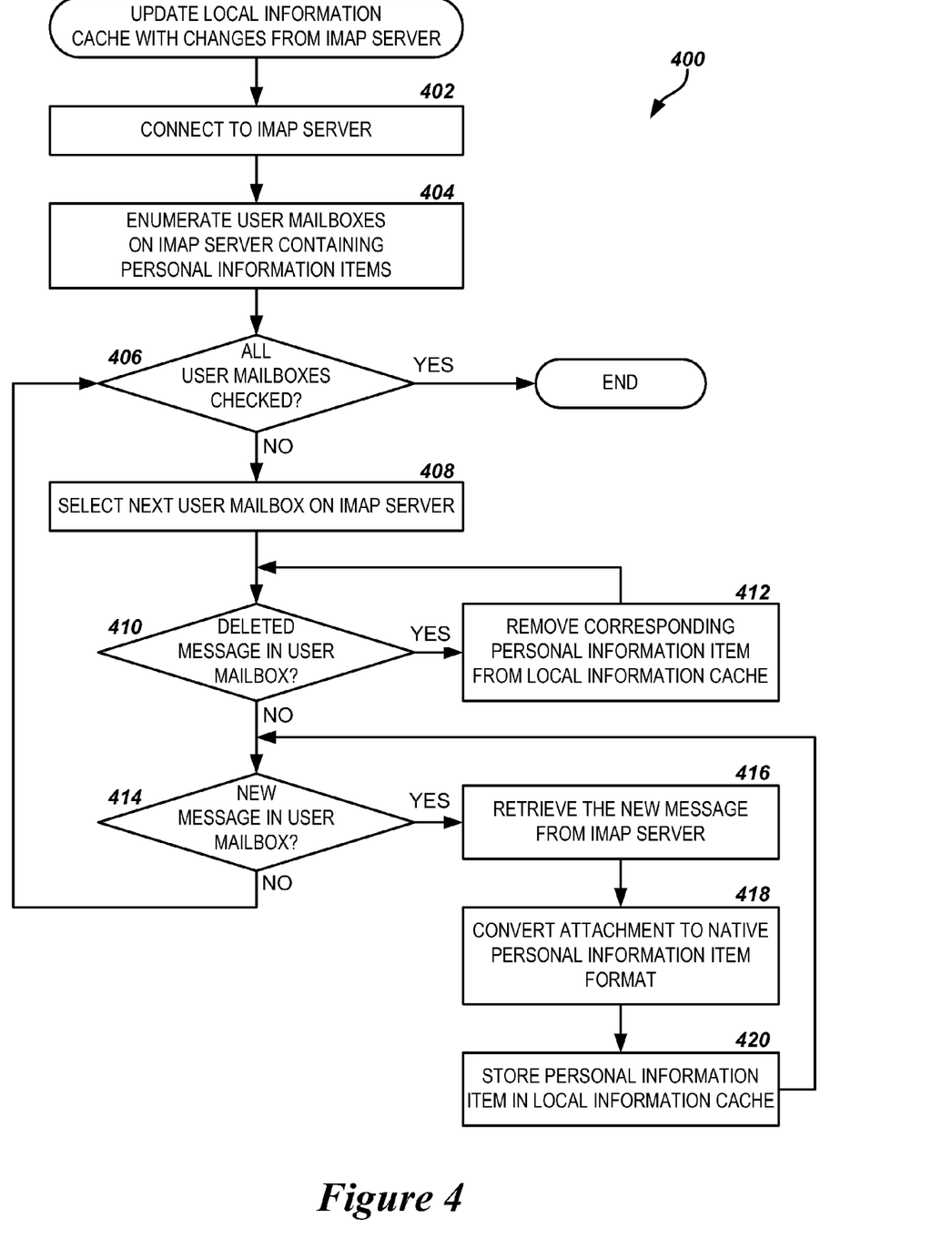
FIG. 4 is a flow diagram showing methods for updating a local information cache of a PIM program with changes to personal information items from an IMAP server, according to embodiments described herein.

Referring now to FIGS. 3 and 4, additional details will be provided regarding the embodiments presented herein. It should be appreciated that the logical operations described with respect to FIGS. 3 and 4 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 3 illustrates a routine 300 for replicating new or modified personal information items to an IMAP server 112, utilizing the IMAP client extension 108 described above. The routine 300 begins at operation 302, where the IMAP client extension 108 detects that a personal information item maintained by the PIM program 104 has been created or modified in the local information cache 106. This may be accomplished by the IMAP client extension 108 monitoring the local information cache 106 for changes, or the IMAP client extension may be informed by the PIM program 104 that a personal information item has changed via a call to an API.

Upon detecting a change to a personal information item, the routine proceeds from operation 302 to operation 304, where the IMAP client extension 108 establishes a connection with the IMAP server 112 over the IP network 110. In one embodiment, the IMAP client extension 108 may maintain an active connection to the IMAP server 112 during the execution of the PIM program 104. This is often referred to as "connected mode" or "working online." In another embodiment, the IMAP client extension 108 may establish a connection to the IMAP server 112 when a personal information item has been modified in the local information cache 106 and is to be replicated to the IMAP server 112. In a further embodiment, the IMAP client extension 108 may establish a connection to the IMAP server 112 on a periodic basis, such as upon initial execution and termination of the PIM program 104, at regularly established intervals, or in response to a user action, such as the click of a "Refresh" button. This may be referred to as "offline mode." When working in this mode, modified personal information items may be marked as modified and replicated to the IMAP sever 112 when the connection is established.

From operation 304, the routine 300 proceeds to operation 306, where the IMAP client extension 108 selects the user mailbox 202 on the IMAP server 112 corresponding to the type of the personal information item to be replicated to the server. According to one embodiment, the IMAP client extension 108 may create and maintain an individual user mailbox 202 on the IMAP server 112 corresponding to the different personal information types maintained by the PIM program 104. The user mailbox 202 may have a specific mailbox name 204 associated with the type of personal information item. For example, calendar items may be maintained in a user mailbox 202 with a mailbox name 204 of "x_calendar," while contacts may be maintained in a user mailbox with a mailbox name 204 of "x_contacts." The specific mailbox names 204 used for the user mailboxes 202 may be implementation specific, or based on a standard established such that PIM programs 104 from different vendors incorporating the IMAP client extension functionality described herein can share personal information items through the IMAP server 112.

In another embodiment, the type of personal information items stored in the user mailbox 202 may be contained in a type-identifying message within each user mailbox maintained by the IMAP client extension 108. The type-identifying message may be established in such a way that it is readily accessible to the IMAP client extension 108, such as positioned so that it is generally returned as the message with a sequence number of 1 in a list of messages in the user mailbox 202. The type of personal information item may be encoded into the message text 212 of the type-identifying message, along with other information, such as the format in which data representing the personal information item is encoded, and other application-specific settings. PIM programs 104 incorporating the IMAP client extension functionality described herein may enumerate the user mailboxes 202 on the IMAP server 112 and access the type-identifying message at sequence number 1 to discover the type of personal information item contained in each user mailbox.

It will be appreciated that any number of methods may be employed by the IMAP client extension 108 to identify the user mailbox 202 that is associated with a particular type of personal information item, including configuring user-definable settings in the PIM program 104, using namespaces on the IMAP server 112, creating an additional user mailbox on the IMAP server containing application settings for the IMAP client extension 108 and/or PIM program 104, or the like. It is intended that this application include all such methods for identifying the user mailbox 202 associated with a particular type of personal information item.

In one embodiment, the IMAP client extension 108 selects the user mailbox 202 associated with the type of personal information item to be replicated using the IMAPv4 "SELECT" command. If the user mailbox 202 does not yet exist on the IMAP server 112, as determined in operation 308, then the routine 300 moves to operation 310, where the IMAP client extension 108 creates the user mailbox on the IMAP server. The IMAP client extension 108 may create the user mailbox 202 using the IMAPv4 "CREATE" command. The IMAP client extension 108 may then associate the created user mailbox 202 with the type of personal information items to be stored therein by setting the mailbox name 204 of the user mailbox and/or creating the type-identifying message in the user mailbox, depending on the specific implementation chosen, as discussed in regard to operation 306. According to one embodiment, the IMAP client extension 108 may create the user mailboxes 202 on the IMAP server for the different types of personal information item maintained by the PIM program 104 upon the initial connection to the IMAP server 112, during configuration of the IMAP client extension, for example.

Next, the routine 300 moves to operation 312, where the IMAP client extension 108 converts the data representing the personal information item from the native format of the PIM program 104 to the format that will be used to store the type of personal information items in the associated user mailbox 202. As described briefly above, the IMAP client extension 108 may store individual personal information items as messages 206 in the user mailbox 202 associated with the type of the personal information item. The data representing the personal information item may be serialized into the body of the message text 212 of the message 206, or it may be encoded as a file attachment to the message based on a specific format or MIME content type. The choice of method for converting the data representing the personal information item may vary with the individual PIM program's implementation of the IMAP client extension functionality.

According to one embodiment, the IMAP client extension 108 may use a different method of converting the data representing the personal information item, depending on the type of the personal information item. For example, calendar items, tasks, and journal entries may be stored as file attachments encoded in an iCalendar format, as defined by IETF RFC 2445 entitled "Internet Calendaring and Scheduling Core Object Specification (iCalendar)." Calendar items may be encoded using the iCalendar VEVENT format, tasks may be encoded using the iCalendar VTODO format, and journal entries may be encoded using the iCalendar VJOURNAL format. Contacts may be stored as file attachments encoded in the widely supported vCard format, while notes may be serialized as text, XML, or HTML into the body of the message 206.

In another embodiment, in addition to the file attachment containing the data representing the personal information item, additional information regarding the personal information item may be encoded into the body of the message 206 to enable PIM programs 104 not incorporating the IMAP client extension functionality described herein to display some information regarding the personal information item. For example, for a contact, the contact's name, phone numbers, and e-mail addresses may be encoded into the body of the message 206 that also contains the vCard format file attachment.

From operation 312, the routine 300 proceeds to operation 314, where the IMAP client extension 108 creates a new message 206 in the user mailbox 202 associated with the type of the personal information item to be replicated. The IMAP client extension 108 may create the new message 206 in the user mailbox 202 using the IMAPv4 "APPEND" command, according to one embodiment. The message text 212 of the new message 206 may contain the converted data representing the personal information item, as described above in regard to operation 312. For example, the message text 212 may contain an RFC 2822 compliant message with the body information and/or file attachments encoded with the format corresponding to the type of personal information item, as described above.

The routine 300 then proceeds from operation 314 to operation 316, where the IMAP client extension 108 determines if the personal information item was previously stored on the IMAP server 112. This may be the case when an existing personal information item has been modified by PIM program 104 in the local information cache 106. The PIM program 104 may maintain this information by storing the unique identifier 208 for the message 206 on the IMAP server 112 corresponding to the replicated personal information items in the local information cache 106. If the personal information item was previously stored on the IMAP server 112, the routine 300 proceeds to operation 318 where the IMAP client extension 108 marks the previously stored message 206 for deletion. This may be done by setting an attribute 210 on the message 206, for example. From operation 318, the routine 300 ends.

In another embodiment, the IMAP client extension 108 may implement a more robust change detection strategy in which the IMAP client extension checks for conflicting or overlapping changes to a personal information item before the item is replicated to the IMAP server 112. This may allow the IMAP client extension 108 to account for a situation where the same personal information item is changed by two different user computing devices 102 before the changed item from the first device has been synchronized to the second device. In this case, the IMAP client extension 108 on the second device may detect the changed personal information item from the first device on the IMAP server 112, and attempt to merge the two sets of changes before replicating the changed item back to the IMAP server.

FIG. 4 illustrates a routine 400 for updating a PIM program's local information cache 106 with changed personal information items from the IMAP server 112, utilizing the IMAP client extension 108 described above. According to one embodiment, the IMAP client extension 108 may use the routine 400 to poll the IMAP server 112 for changes to personal information items stored on the IMAP server. The routine 400 may be performed on a periodic basis by the IMAP client extension 108, or the routine may be performed once upon initial startup of the PIM program 104. The implementation is a matter of choice, and may be configurable by a user of the PIM program 104. The routine 400 begins at operation 402, where the IMAP client extension 108 establishes a connection with the IMAP server 112 over the IP network 110. As described above in regard to operation 304, the IMAP client extension 108 may maintain a connection to the IMAP server 112 during the execution of the PIM program 104, or it may establish a connection to the IMAP server on a periodic basis.

Upon connecting to the IMAP server 112, the routine 400 proceeds from operation 402 to operation 404, where the IMAP client extension 108 enumerates the user mailboxes 202 on the IMAP server that contain personal information items maintained by the PIM program 104. In one embodiment, the IMAP client extension 108 may use the IMAPv4 "LIST" command to list the user mailboxes 202 for the user on the IMAP server 112 and discover the type of personal information items contained in the mailboxes. For example, the IMAP client extension 108 may reference the type-identifying messages contained in the different user mailboxes 202, as discussed above in regard to operation 306. In another embodiment, the IMAP client extension 108 may iterate through the known mailbox names 204 of the user mailboxes 202 containing personal information items.

Next at operation 406, the IMAP client extension 108 determines if all user mailboxes 202 on the IMAP server 112 enumerated in operation 404 have been synchronized, in other words, whether all the changed messages 206 in the user mailboxes containing personal information items maintained by the PIM program 104 have been updated in the local information cache 106. If not all of the user mailboxes 212 enumerated in operation 404 have been synchronized, then the routine 400 proceeds from operation 406 to operation 408, where the IMAP client extension 108 selects the next user mailbox on the IMAP server 112. According to one embodiment, the IMAP client extension 108 may select the user mailbox 202 using the IMAPv4 "SELECT" command Once the mailbox is selected, the routine 400 proceeds from operation 408 to operation 410, where the IMAP client extension 108 determines whether any messages 206 containing personal information items have been deleted from the user mailbox 202. This may be done by enumerating the unique identifiers 208 of the messages 206 stored in the user mailbox 202 and comparing them with the unique identifiers maintained with the personal information items in the local information cache 106. If a message 206 in the user mailbox 202 corresponding to a personal information item in the local information cache 106 is marked for deletion, or if a message 206 corresponding to a personal information item no longer exists in the user mailbox, the routine 400 proceeds from operation 410 to operation 412. In operation 412, the IMAP client extension 108 removes the corresponding personal information item from the local information cache.

From operation 412, the routine 400 returns to operation 410, where the IMAP client extension 108 determines if any additional messages 206 containing personal information items have been deleted from the user mailbox 202. If no more messages 206 containing personal information items have been deleted, the routine 400 proceeds from operation 410 to operation 414, where the IMAP client extension 108 determines if any messages 206 containing personal information items have been added to the user mailbox 202. As in operation 410, this may be accomplished by enumerating the unique identifiers 208 of the messages 206 stored in the user mailbox 202 and comparing them with the unique identifiers maintained with the personal information items in the local information cache 106. If a new message 206 exists in the user mailbox 202 containing a personal information item, the routine 400 proceeds from operation 414 to operation 416, where the IMAP client extension 108 retrieves the new message containing the personal information item from the IMAP server 112.

From operation 416, the routine 400 proceeds to operation 418, where the IMAP client extension 108 converts the data representing the personal information item from the format stored in the IMAP message 206 to the native format of the PIM program 104. As discussed above in regard to operation 312, the data for the personal information item may be serialized into the body of the message text 212 of the new message 206, or it may be encoded as a file attachment to the message based on a specific format or MIME content type. The IMAP client extension 108 may extract the data from the message text 212 of the message 206 accordingly, and convert it to the native format of the PIM program 104 for storage in the local information cache 106.

The routine 400 then proceeds from operation 418 to operation 420, where the IMAP client extension 108 stores the personal information item from the new message 206 in the local information cache 106 in the format native to the PIM program 104. Next, the routine 400 returns to operation 414, where the IMAP client extension 108 determines if any additional messages 206 containing personal information items have been added to the user mailbox 202. If no more new messages 206 exist in the user mailbox 202, the routine 400 returns to operation 406, where the IMAP client extension 108 determines if all user mailboxes 202 on the IMAP server 112 enumerated in operation 404 have been synchronized. Once all the user mailboxes 202 containing personal information items on the IMAP server 112 have been synchronized, the routine 400 ends.

According to another embodiment, the IMAP server 112 may notify the IMAP client extension 108 of deleted or added messages 206 in a user mailbox 202 containing personal information items maintained by the PIM program 104. This may be accomplished by the IMAP client extension 108 receiving from the IMAP server 112 "IDLE" responses that contain status information of the currently selected user mailbox 202, as defined by the IMAPv4 protocol. Because the IMAP server 112 typically provides notifications with status information only regarding the currently selected user mailbox 202, the IMAP client extension 108 may establish a separate connection with the IMAP server 112 for the different user mailboxes 202 containing personal information items. The IMAP client extension 108 may then select the corresponding user mailbox 202 in the IMAP session for each connection in order to receive change notifications for messages 206 contained in that user mailbox.

When the IMAP client extension 108 receives a notification of a deleted message 206 in a user mailbox 202 containing personal information items maintained by the PIM program 104, the IMAP client extension 108 may then remove the corresponding personal information item from the local information cache 106, as described above in regard to operation 412. Similarly, when the IMAP client extension 108 receives a notification of a new message 206 added to a user mailbox 202 containing personal information items, the IMAP client extension 108 may retrieve the new message, convert the data for the personal information item to the native format of the PIM program 104, and store the personal information item from the new message 206 in the local information cache 106, as described above in regard to operations 416, 418, and 420.

It will be appreciated by one skilled in the art that methods for replicating new or modified personal information items from the local information cache 106 to the IMAP server 112 and updating the local information cache with changes to personal information items from the IMAP server may be utilized other than those described above in regard to FIGS. 3 and 4. These other methods may further utilize different commands, facilities, interfaces, or capabilities of the IMAPv4 protocol than those described herein. It is intended that all such methods be included in this application.

Figure 5:
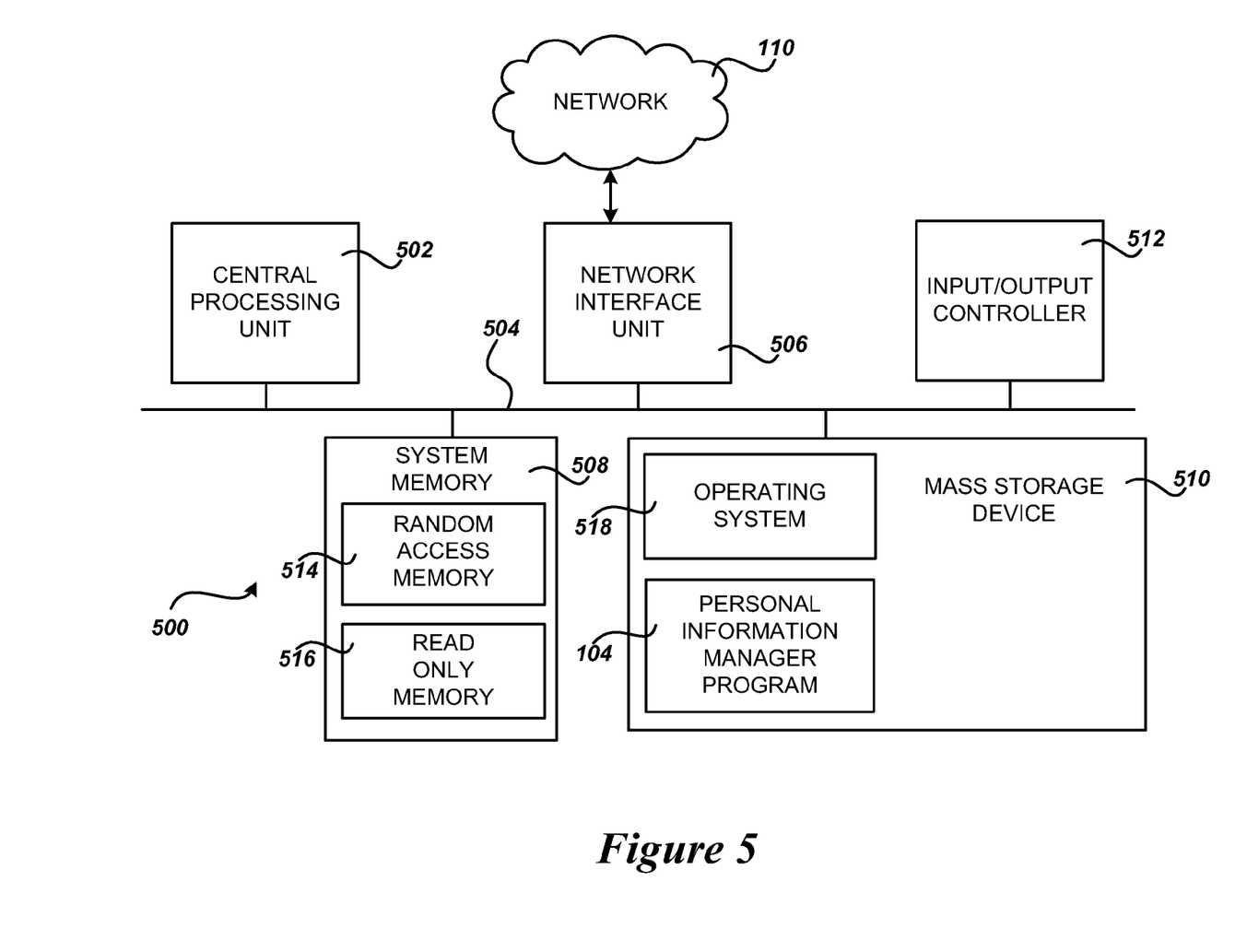
FIG. 5 is a block diagram showing illustrative computer hardware and software architectures for a computing system capable of implementing aspects of the embodiments presented herein.

FIG. 5 shows an example computer architecture for computers 500 capable of executing the software components described herein for roaming personal information items across multiple computing devices utilizing an IMAP server, in the manner presented above. The computer architecture shown in FIG. 5 illustrates a conventional computing device, PDA, digital cellular phone, communication device, desktop computer, laptop, or server computer and may be utilized to execute any aspects of the software components presented herein described as executing on the computing device 102, the mail server computer 114, or other computing platform.

The computer architecture shown in FIG. 5 includes a central processing unit 502 (CPU), a system memory 508, including a random access memory 514 (RAM) and a read-only memory 516 (ROM), and a system bus 504 that couples the memory to the CPU 502. A basic input/output system containing the basic routines that help to transfer information between elements within the computer 500, such as during startup, is stored in the ROM 516. The computer 500 also includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 500.

According to various embodiments, the computer 500 may operate in a networked environment using logical connections to remote computers through a network, such as the IP network 110. The computer 500 may connect to the IP network 110 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, a mouse, or an electronic stylus (not shown in FIG. 5). Similarly, the input/output controller 512 may provide output to a display, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a computer. The mass storage device 510 and RAM 514 may also store one or more program modules. In particular, the mass storage device 510 and the RAM 514 may store the PIM program 104, the IMAP client extension 108, or the IMAP server 112, each of which was described in detail above in regard to FIG. 1. The mass storage device 510 and the RAM 514 may also store other types of program modules or data.

Based on the foregoing, it should be appreciated that technologies for roaming personal information items across multiple computing devices utilizing an IMAP server are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for roaming personal information items across multiple computing devices using an Internet Message Access Protocol ("IMAP") server, the method comprising:
   receiving data representing a personal information item from a PIM program executing on a first computing device;
   utilizing the IMAP protocol to upload the data representing the personal information item from the first computing device to the IMAP server, wherein the data representing the personal information item is stored as a message in a user mailbox designated to hold personal information items on the IMAP server;
   at a second computing device, utilizing the IMAP protocol to download the data representing the personal information item from the message in the user mailbox from the IMAP server to the second computing device; and
   providing the data representing the personal information item to a PIM program executing on the second computing device.

2. The method of claim 1, wherein the personal information item comprises one of a calendar item, a contact, a task, a note, and a journal entry.

3. The method of claim 1, wherein the message storing the data representing the personal information item comprises a message in the Internet Message Format, and wherein the data representing the personal information item is encoded as a file attachment to the message.

4. The method of claim 1, wherein receiving the data representing the personal information item from the PIM program executing on the first computing device comprises detecting a change to a personal information item in a local information cache of the PIM program on the first computing device.

5. The method of claim 4, further comprising:
   upon detecting the change to the personal information item, converting the data representing the personal information item from a first format of the data stored in the local information cache to a second format for storage on the IMAP server.

6. The method of claim 5, wherein providing the data representing the personal information item to the PIM program executing on the second computing device comprises storing the data representing the personal information item in a local information cache of the PIM program on the second computing device.

7. The method of claim 6, further comprising:
   upon downloading the data representing the personal information item, converting the data representing the personal information from the second format of the data stored in the message on the IMAP server to a third format for storage in the local information cache of the PIM program executing on the second computing device.

8. The method of claim 1, further comprising:
   utilizing the IMAP protocol to create a user mailbox on the IMAP server designated to hold messages storing data representing personal information items of a particular type.

9. The method of claim 8, wherein designating the user mailbox on the IMAP server to hold messages storing data representing personal information items of the particular type comprises storing a type-identifying message within the user mailbox.

10. A system for roaming personal information items across multiple computing devices using an Internet Message Access Protocol ("IMAP") server, the system comprising:
    a first computing device comprising a processor and a memory;
    a PIM program stored in the memory and executing on the processor of the first computing device and operative to maintain personal information items in a local information cache on the first computing device; and
    an IMAP client extension module stored in the memory and executing on the processor of the first computing device and operative to
    detect a changed personal information item maintained by the PIM program, and
    utilize the IMAP protocol to upload data representing the changed personal information item from the first computing device to the IMAP server, wherein the data representing the changed personal information item is stored as a message in a user mailbox designated to hold personal information items on the IMAP server, and wherein the message in the user mailbox containing the data representing the changed personal information item is downloaded through the IMAP protocol by a second computing device and provided to a PIM program executing on the second computing device.

11. The system of claim 10, wherein the changed personal information item comprises one of a calendar item, a contact, a task, a note, and a journal entry.

12. The system of claim 10, wherein the message storing the data representing the changed personal information item comprises a message in the Internet Message Format, and wherein the data representing the changed personal information item is encoded as a file attachment to the message.

13. The system of claim 10, wherein the IMAP client extension module is further operative to:

upon detecting the changed personal information item, convert the data representing the changed personal information item from a first format of the data stored in the local information cache to a second format for storage on the IMAP server.

14. The system of claim 13, wherein providing the data representing the changed personal information item to the PIM program executing on the second computing device comprises:
converting the data representing the changed personal information from the second format of the data stored in the message on the IMAP server to a third format for storage in a local information cache of the PIM program executing on the second computing device; and
storing the data representing the changed personal information item in the local information cache of the PIM program on the second computing device.

15. The system of claim 10, wherein the IMAP client extension module is further operative to utilize the IMAP protocol to create a user mailbox on the IMAP server designated to hold messages storing data representing personal information items of a particular type.

16. The system of claim 15, wherein designating the user mailbox on the IMAP server to hold messages storing data representing personal information items of the particular type comprises naming the user mailbox with a mailbox name corresponding to the particular type.

17. A computer-readable storage medium that is not a signal, the medium having computer executable instructions stored thereon that, when executed by a computing device, cause the computing device to:
receive data representing a first personal information item from a PIM program executing on the computing device;
convert the data representing the first personal information item from a first format native to the PIM program to a second format for storage as a message on an Internet Message Access Protocol ("IMAP") server;
utilize the IMAP protocol to append the message storing the data representing the first personal information item to a user mailbox designated to hold personal information items on the IMAP server;
detect a new message in the user mailbox on the IMAP server, the new message storing data representing a second personal information item in the second format;
utilize the IMAP protocol to request the new message from the IMAP server;
receive the new message at the computing device;
extract the data representing the second personal information item from the new message;
convert the data representing the second personal information item from the second format to the first format native to the PIM program; and
provide the data representing the second personal information item to the PIM program.

18. The computer-readable storage medium of claim 17, wherein the personal information items consist essentially of one or more of a calendar item, a contact, a task, a note, and a journal entry.

19. The computer-readable storage medium of claim 17, wherein the messages storing the data representing the first and second personal information items comprise messages in the Internet Message Format, and wherein the data representing the first and second personal information items are encoded as a file attachments to the messages.

20. The computer-readable storage medium of claim 17, wherein providing the data representing the second personal information item to the PIM program comprises storing the data representing the second personal information item in a local information cache of the PIM program on the computing device.

* * * * *